UNITED STATES PATENT OFFICE.

LEWIS KIRK AND JOHN DODSWORTH, OF READING, PENNSYLVANIA.

IMPROVEMENT IN LUBRICATING COMPOUNDS.

Specification forming part of Letters Patent No. 5,333, dated October 16, 1847.

*To all whom it may concern:*

Be it known that we, LEWIS KIRK and JOHN DODSWORTH, of Reading, in the county of Berks and State of Pennsylvania, have invented a new and useful Composition of Matter for Lubricating Machinery; and we do hereby declare that the following is a full, clear, and exact description of the principle or character which distinguishes it from all other things before known, and of the manner of making and using the same.

The nature of our invention consists in mixing together under a high degree of temperature—say 500° of Fahrenheit's scale—whale or other oil, lard, or other like or equivalent substance with coal-tar or with asphaltum, or with both.

The method of compounding and treating when the three substances are to be used is as follows, viz: Put six parts, by weight, of whale or other oil, or lard, or other like equivalent substance, in a kettle, and one part of asphaltum, stirring the mass, and applying heat gradually until it reaches about 500° or 600° of Fahrenheit's scale, and until thoroughly dissolved and mixed, and then add two parts of coal-tar and continue stirring until this third ingredient is thoroughly dissolved and mixed with the others. The mass is then suffered to cool, and can be put up in bottles or other vessels for use. The compound thus prepared is a dark liquid, which is more fluid than whale-oil, and does not congeal at the temperature of our climate.

By omitting either the coal-tar or the asphaltum some of the important results which we claim for our compound may be obtained; but by far the best results are obtained with the three.

What we therefore claim as our invention, and desire to secure by Letters Patent, is—

Combining together under a high degree of heat whale or other oil, or lard, or other like or equivalent substance with asphaltum or with coal-tar, or with both together, substantially as described, and thereby producing a compound for lubricating machinery which we find by experience to prevent friction and heating better than any other substance or substances known to us.

LEWIS KIRK.
JOHN DODSWORTH.

Witnesses:
JOHN X. MILLER,
WILLIAM BETZ.